United States Patent [19]

Ott

[11] Patent Number: 4,675,226

[45] Date of Patent: Jun. 23, 1987

[54] STITCHBONDED COMPOSITE WIPER

[76] Inventor: Hoye L. Ott, 17 Madrone Ct., Fairfax, Calif. 94930

[21] Appl. No.: 882,421

[22] Filed: Jul. 7, 1986

[51] Int. Cl.⁴ .............................................. B32B 3/06
[52] U.S. Cl. ............................... 428/102; 15/104.93; 66/202; 428/284; 428/286; 428/298; 428/340; 428/903; 428/913
[58] Field of Search .................. 66/190, 192, 193, 196, 66/191, 202; 428/102, 284, 286, 298, 340, 903, 913; 15/104.93

[56] References Cited

U.S. PATENT DOCUMENTS

| | | | |
|---|---|---|---|
| H90 | 7/1986 | Kumar | 66/192 |
| 3,279,221 | 10/1966 | Gliksmann | 66/192 |
| 3,327,501 | 6/1967 | Bahlo | 66/190 |
| 3,649,428 | 3/1972 | Hughes | 66/192 |
| 3,672,187 | 6/1972 | Simpson | 66/192 |
| 3,695,985 | 0/1972 | Brock | 161/129 |
| 3,769,815 | 11/1973 | Ploch et al. | 66/192 |
| 3,837,995 | 0/1974 | Floden | 161/150 |
| 3,870,592 | 0/1975 | Brock | 161/148 |
| 3,954,074 | 5/1976 | Wildeman | 66/192 |
| 4,039,711 | 0/1971 | Newman | 428/286 |
| 4,041,203 | 0/1977 | Brock | 428/157 |
| 4,277,527 | 7/1981 | Duhl | 66/190 |
| 4,436,780 | 0/1984 | Hotchkiss | 428/198 |

OTHER PUBLICATIONS

T. M. Holliday "Stitchbonding–Alive and Well" 1984 Nonwovens Industry pp. 16–18 and 52.

Primary Examiner—James J. Bell

[57] ABSTRACT

Stitchbonded composite wiper with improved softness, bulk, hand conformity, absorbency and strength performance characteristics having a construction comprised of a middle layer of cellulose natural fibers and outer layers of either continuous filament thermoplastic fibers, meltblown thermoplastic microfibers or rayon fibers. The layers are laminated into a composite by stitch-bonding using stitching yarn of either polyester, cotton, rayon, nylon or a blend. The preferred construction of an inner layer of two ply lightweight cellulose natural fibers with relatively lightweight continuous filament thermoplastic fiber layers, on both outer sides of the cellulose fiber layer, bonded by stitching with a medium to heavy textile yarn in a prescribed stitch pattern provides a composite wiper having layer bond strength and hand feel of a desired textile nature along with improved wipe performance characteristics. This stitchbonded composite wiper while economically disposable is reusable and effective for multiple applications, particularly those applications of a heavy duty nature wherein wiping is traditionally performed using textile wiping materials or heavy weight nonwovens.

11 Claims, 2 Drawing Figures

STITCHBONDED COMPOSITE WIPER

BACKGROUND

1. Field Of Invention

This invention relates to disposable wipers having multiple purposes and applications in both industrial and consumer industries. While there are a variety of applications it is particularly useful for industrial, institutional and health care heavy duty wiping uses where textile wiping materials and some nonwoven and natural fiber wipers are traditionally used. Such wipers must have excellent strength and absorbency performance characteristics, soft handfeel, bulk, conformity and of overall durability to be reused if desired. While some textile wiping materials and some disposable nonwovens possess some of the desired characteristics, they may be restricted in use due to the nature of their embodiments or, as is the case with some nonwovens, by adverse characteristics resulting from the method of material manufacture or material web laminating such as with adhesives, hot embossing or autogenous bonding. It is therefore desirable to improve the presence of all the performance characteristics as a combination, particularly strength and absorbency, by way of a wipe material that is softer with more bulk and conformity than many textile and nonwoven wiping materials and at a cost that is traditionally lower than textile wipers and many nonwoven wipers.

2. Description Of Prior Art

U.S. Pat. No. 3,837,995 to J. Floden issued Sept. 24, 1974 describes a autogenously bonded nonwoven web consisting of one or more layers of synthetic, thermoplastic polymeric microfibers and one or more layers of natural fibers bonded by layer contact when drawn through or over machine rollers. Supplemental bonding may be required between the natural fiber layers when multi plies of natural fibers are used. This wiper laminate is said to have a softer handfeel than wiper laminates of composite webs having been supplementaly bonded by adhesives or by hot embossing. This wiper laminate is useful for limited applications where bond strength requirements are normally 1.5 g/cm(-).

U.S. Pat. No. 3,870,592 to R. Brock issued Mar. 11, 1975 describes a laminate comprised of outer webs of continuous thermoplastic filaments and an inner web of cellulose wadding. Composite layer bonding is accomplished by applying a piastisol adhesive to the cellulose web which is then brought in contact with the continuous filament webs through rollers and then passed over a heated drum for curing. While recognizing that supplemental bonding has a adverse effect on some laminate characteristics such as softness and absorbency, this laminate did provide improved hand feel and absorbency over a web of continuous thermoplastic filament alone.

U.S. Pat. No. 3,695,985 to R. Brock issued Oct. 3, 1972 describes a hight bulk laminate with continuous thermoplastic polymer filament inner layer and outer layers of cellulosic web. The composite layers are supplemental-bonded by adhesives to set the cellulose webs with the continuous filament web and then hot embossed as a second step to set the laminated web into a predetermined pattern. This composite laminate relates to nonwoven disposable materials, particularly those utilized for toweling, and exhibits improved bulk, absorbency and resiliency over traditional nonwoven disposable toweling at that time. As referenced in the aforementioned prior art, this method of supplemental web bonding usually adversely effects softness and absorbency and may limit the number and variety of uses.

Production per se of continuous thermoplastic filament layers and the manner of formation are not particularly important to this invention and different techniques may be used some of which are set forth in U.S. Pat. Nos. 3,338,992 and 3,341,394 issued to Kinney. Various types of material polymers may also be used to form the continuous filament web while the preferred described herein is polypropylene.

Production per se of natural cellulose fiber layers are not particulaly important to this invention and various fiber types made by conventional wet or dry formed methods may be used.

The manner of stitchbonding the composite wiper web is performed by stitchbonding machines, preferrably Maliwatt machines, as referenced in T. Holiday's "Stitchbonding—Alive and Well" Non-wovens Industry, February 1984 and by Maliwatt and Malimo stitching and knitting machines descriptive literature.

SUMMARY OF INVENTION—OBJECTS AND ADVANTAGES

The present invention accordingly claims as objects and advantages to be a uniquely improved composite wiper with improved handfeel softness, bulk and hand conformity and improved absorbency and strength performance characteristics. The wiper is a stitchbonded composite web of two relatively lightweight continuous filament thermoplastic layers with one each of the outsides of one or more layers of relatively light to medium weight natural cellulose fiber layers. The thermoplastic and natural fiber layers are bonded together by stitching using polyester, rayon or a blend stitch yarn of 125 to 175 denier. By the nature of the material layers having been bonded together by a textile method of stitching, the composite wiper is extremely cloth like, durable and useful for many general and specific wipe uses. Because it is very cloth like yet disposable, it is particularly useful as a lower cost alternative to textile wiping materials and many nonwoven wipers. Also, as a improved performance alternative to many textile wiping cloths, nonwoven wipers and natural cellulose wipes.

DESCRIPTION OF INVENTION PREFERRED EMBODIMENTS

While the invention will be described as to preferred embodiments it is not suggested to limit the invention to only these embodiments. It is intended to cover all alternatives and modifications as may be included within the spirit and scope of the invention as defined by the claims.

The methods of forming the spunbonded continuous filament thermoplastic web layer and the cellulose natural paper web are not part of this invention and different methods and web material embodiments can be used. The preferred continuous filament used in this invention was polypropylene. The cellulose natural fiber web may be either wet formed or dry formed while the preferred embodiment used herein was two ply lightweight wet formed tissue.

The stitchbonding method of laminating the continuous filament layers with the cellulose natural fiber layer is in and by itself not part of this invention. The stitchbonding may be accomplished with either Maliwatt or Malimo stitching machines while the preferred embodiment with this invention was polyester yarn stitched with a Maliwatt machine.

The invention is therefore the stitchbonded composite laminate wiper which by way of stitch laminating and imparting textile yarn into the wiper, with its inherent textile qualities, produces a unique disposable wiper with unexpected combinations of improved softness, bulk, hand conformity and absorbency and strength performance characteristics.

In the preferred embodiment the spunbonded continuous filament layers are relatively lightweight polypropylene preferrably in the range of 17–20 gsm per layer having fibers with a diameter range of 15–20 microns. The cellulose natural fiber layer is a two ply relatively lightweight wet formed tissue preferrable in the weight range of 16–23 gsm per ply with fibers having a diameter range of 20–50 microns.

Bonding the independent spunbonded continuous filament layers and cellulose natural fiber layer is preferrably done with a Maliwatt stitching machine using polyester stitching yarn having a denier of 140–160. The preferred stitch used in this invention has a length of 3 milimeters and is spaced in the cross web direction at 14 stitch lines per inch or 14 guage. The yarn having been stitched into the materials layers in this manner imparts a yarn weight of 40–50 gsm basis weight.

Figure 1:
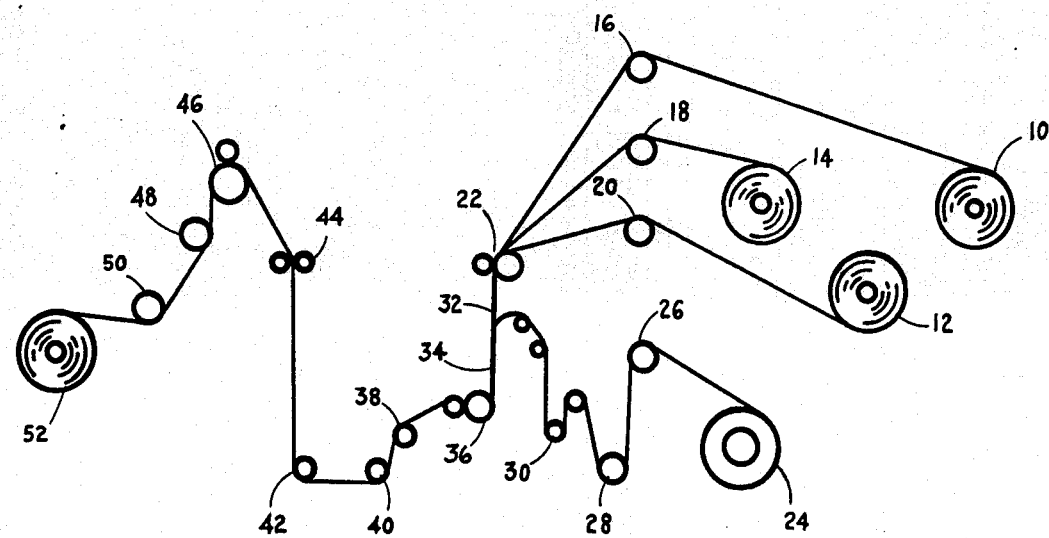
FIG. 1 schematically illustrates a process for making the composite wiper of the present invention.

In FIG. 1 referenced, the stitchbonding of the two outer spunbonded continuous filament layers with the inner layer of two ply cellulose natural fiber is described. Other types of thermoplastic fiber layers having various weights may be used in combination with cellulose natural fiber layers of various weights, formed by means other than wet forming and bonded by stitching with yarn material other than polyester, in various stitch sizes, that will be apparent to those skilled in the art. It is therefore not intended to limit this invention to the specific materials and procedure hereto described.

As shown in FIG. 1 the independent webs of spunbonded continuous filament 10 and 12 are joined with a two ply cellulose natural paper web 14 by being drawn over lap rolls 16, 18 and 20 by turn roll 22. The polyester stitching yarn 24 is drawn over idler rolls 26 and 28 by turn rolls 30 into the needle bank 32 where the spunbonded and cellulose webs are stitched to form the stitchbonded composite wiper laminate 34. The composite laminate is by turn roll 36 over idler rolls 38, 40 and 42 to edge trim 44 and from there drawn by turn roll 46 over lap rolls 48 and 50 to the composite laminated parent roll 52.

Figure 2:
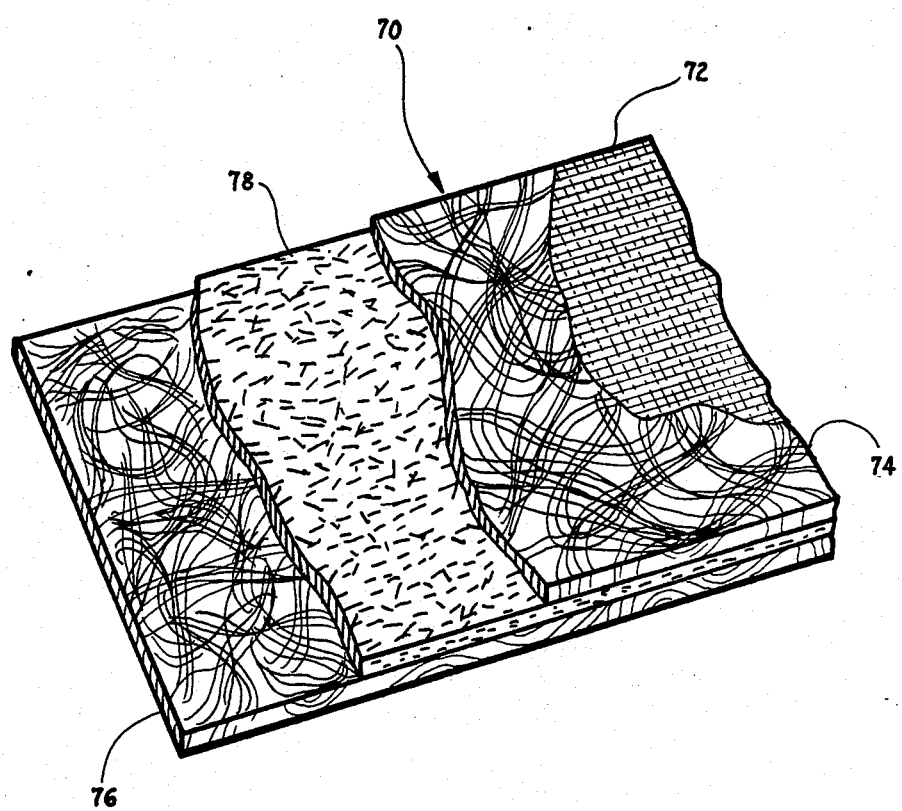
FIG. 2 illustrates the embodiments of the present invention showing a multi layer composite wiper where the inner layer is made of two ply natural cellulose and the two outer layers are made of continuous filament thermoplastic fiber.

The stitchbonded composite wiper laminate referenced in FIG. 1 is illustrated as a individual wiper 70 in FIG. 2 whereby 72 is the stitched laminate surface, 74 and 76 are the spunbonded continuous filament outer layers and 78 is the inner layer of cellulose natural fibers. The weight of this stitchbonded composite wiper is 121 gsm basis weight or 74 lbs./3M ft.$^2$.

The invention will now be described in terms of specific examples having various embodiments.

EXAMPLE 1

A stitchbonded composite wiper with two outer layers of continuous filament thermoplastic spunbonded polypropylene formed in accordance with aforementioned U.S. Pat. Nos. 3,338,992 and 3,341,394 and having a weight of 18.5 gsm per layer. A inner layer of two plies of cellulose natural fibers having been wet formed with a basis weight of 21 gsm per ply.

The spunbonded continuous filament layers and cellulose natural fiber layer are stitchbond laminated together by Maliwatt stitching with polyester yarn of 150 denier. The finished stitch is 3 mm long and spaced in the cross direction at 14 stitch lines per inch and has a yarn stitch basis weight of 45 gsm. The composite wiper has a total basis weight of 124 gsm or 76 lbs./3M ft.$^2$.

EXAMPLE 2

Example 1 was repeated except in place of the spunbonded continuous filament layers, meltblown thermoplastic microfiber layers having a basis weight of 18.5 gsm were used. The meltblown microfibers have diameters up to 10 microns and the layers are formed in accordance with known techniques such as set forth in U.S. Pat. Nos. 3,715,251 and 3,704,198.

EXAMPLE 3

Example 1 was repeated except in place of the inner layer of two plies of cellulose natural fiber an inner layer of one ply cellulose natural fiber was used having been wet formed with a basis weight of 42.5 gsm. The stitchbonded composite wiper has a finished basis weight of 124.5 gsm or 77 lbs./3M ft.$^2$.

EXAMPLE 4

Example 1 was repeated except in place of the inner layer of two plies of cellulose natural fiber an inner layer of three ply cellulose natural fiber was used having been wet formed with a basis weight of 16.25 gms per ply. The stitchbonded composite wiper has a finished basis weight of 130.75 gsm or 80 lbs./3M ft.$^2$.

EXAMPLE 5

In this example a stitchbonded composite wiper laminate is made with two layers of dry formed cellulose natural fibers. The cellulose layers contain up to 20% rayon fibers predominantly arranged toward the layers outer surfaces by way of dry forming and each layer is 45 gsm basis weight. The two layers are stitchbond laminated together as described in example 1 to form a composite wiper having a basis weight of 135 gsm or 83 lbs./3M ft.$^2$.

The present invention, in the form of Example 1, was tested for physical properties with respect to wipe performance characteristics. Test results are presented below in Table I and show the invention to have improved absorbency and strength combinations and greater bulk than traditional wiping materials.

In addition, Example 1 of the invention was tested in work place settings by users of traditional, commercial textile and nonwoven wiping materials. The work place tests resulted in favorable user evaluations which are presented in the Subjective Rating comment and in Table II.

TABLE I

| Test[4] | Invention Example 1 | Textile[1] Wiping | Nonwoven[2] Wiping | Cellulose[3] Wiping |
|---|---|---|---|---|
| Basis Wgt.-lbs./3M Ft.$^2$ | 76 | 102 | 42 | 44 |
| Lobb Bulk-Mil./Material | 24 | 21 | 21 | 10 |
| Dry Tensile-Oz./In. (MD + CD) | 680 | 730 | 82 | 71 |
| Wet Tensile-Oz./In. (MD + CD) | 661 | 724 | 42 | 28 |
| Water Absorb.-G/M$^2$ | 650 | 294 | 443 | 309 |
| Water Absorb.-% Wgt. | 575 | 176 | 637 | 454 |
| Water Absorb. Rate-Sec./.1 cc | 1 | 195 | 4 | 2 |
| Oil Absorb.-G/M$^2$ | 700 | 605 | 358 | 323 |
| Oil Absorb.-% Wgt. | 600 | 368 | 520 | 475 |
| Oil Absorb. Rate-Sec./.1 cc | 3 | 4 | 35 | 12 |

[1] Bleached, semi bleached and colored textile wiping materials average tests results.
[2] Four ply cellulose tissue and center ply nylon scrim wiping material with adhesive bonding.
[3] Two ply wet formed cellulose natural fiber wiping material with emboss layer bonding.
[4] Tests are recognized T.A.P.P.I. and ASTM procedures.

SUBJECTIVE RATING

Wiping performance tests were conducted by 175 users in their work places. Example 1 of the invention was evaluated for material softness, bulk, hand conformity and performance characteristics such as absorbency, strength and reusability. Wipe performance ratings for the invention were made with respect to comparing the same performance criteria to the user's current textile and nonwoven wipe material.

Overall, 64% of the 175 evaluators ranked Example 1 favorable when compared to their own commercially purchased textile and nonwoven wipe materials. Individual characteristic rankings are presented in Table II.

TABLE II

| | |
|---|---|
| Softness, Bulk and Hand Conformity | 76% Favorable |
| Strength | 63% Favorable |
| Absorbency | 54% Favorable |
| Total Average: | 64% Favorable |

Thus it is apparent that there has been provided, in accordance with the invention, a stitchbonded composite wiper that fully satisfies the objects, aims and advantages set forth above. While the invention has been described in conjunction with specific embodiments, it is evident that various alternatives or modifications may exist to one skilled in the art and accordingly is intended to embrace all such alternatives or modifications within the spirit and scope of the claims.

We claim:

1. A stitchbonded composite wiper comprised of an inner layer of cellulose natural fibers having a basis weight of 14.5 gsm to 90 gsm per ply with average fiber diameters in excess of 10 microns and as part of the composite, two outer layers, one layer on each side of said cellulose layer, of synthetic thermoplastic polymer fibers having a basis weight of 16 gsm to 60 gsm per layer with fiber diameters averaging 2 microns or more and all said layers to be bonded into a composite wiper laminate by means of stitching with polyester yarn having a denier of 15 and up and said stitch to be of a plain or interlocking type with a machine direction length of 1 mm to 5 mm and cross direction line spacing of 3.5 to 22 lines per inch.

2. The composite wiper of claim 1 wherein the inner layer of cellulose natural fibers is one ply wet formed having a basis weight up to 90 gsm.

3. The composite wiper of claim 1 wherein the inner layer of cellulose natural fibers is two ply wet formed whereby each ply has a basis weight of at least 14.5 gsm.

4. The composite wiper of claim 1 wherein the inner layer of cellulose natural fibers is three ply wet formed whereby each ply has a basis weight of at least 14.5 gsm.

5. The composite wiper of claim 1 wherein the inner layer of cellulose natural fibers is one ply dry formed having a basis weight up to 90 gsm.

6. The composite wiper of claim 1 wherein the inner layer of cellulose natural fibers is two ply dry formed whereby each ply has a basis weight of at least 14.5 gsm.

7. The composite wiper of claim 5 or 6 wherein the dry formed inner layer of cellulose fibers contain at least 10% rayon fibers predominantly located near the layer surfaces.

8. The composite wiper of claim 1 wherein the two outer layers of synthetic thermoplastic polymer fibers, one layer on each side of said cellulose layer, are spun-bonded continuous filaments of polypropylene whereby each layer has a basis weight of at least 16 gsm.

9. The composite wiper of claim 1 wherein the two outer layers of synthetic thermoplastic polymer fibers, one layer on each side of said cellulose layer, are melt-blown discontinuous microfibers of polypropylene whereby each layer has a basis weight of at least 16 gsm.

10. The composite wiper of claim 9 wherein the two outer layers of meltblown discontinuous microfibers contain at least 10% cellulose fibers located randomly throughout the layers.

11. The composite wiper of claim 1 wherein the stitching yarn is a material other than polyester, such as, rayon, cotton, nylon or blend.

* * * * *